United States Patent
Cochran et al.

(10) Patent No.: US 11,149,119 B2
(45) Date of Patent: Oct. 19, 2021

(54) GELS DERIVED FROM POLY(ETHYLIDENE NORBORNENE)-B-POLY(CYCLOPENTENE) BLOCK COPOLYMER NANOCOMPOSITES FOR VISCOSITY MODIFICATIONS AND DRILLING FLUID APPLICATIONS

(71) Applicant: Iowa State University Research Foundation, Inc., Ames, IA (US)

(72) Inventors: Eric W. Cochran, Ames, IA (US); Sri Harsha Kalluru, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 16/560,394

(22) Filed: Sep. 4, 2019

(65) Prior Publication Data
US 2020/0071469 A1    Mar. 5, 2020

Related U.S. Application Data

(60) Provisional application No. 62/726,835, filed on Sep. 4, 2018.

(51) Int. Cl.
| | | |
|---|---|---|
| C08J 3/09 | (2006.01) | |
| C08F 292/00 | (2006.01) | |
| C08K 3/34 | (2006.01) | |
| C09K 8/12 | (2006.01) | |
| B01J 31/22 | (2006.01) | |
| B82Y 30/00 | (2011.01) | |
| C08K 9/00 | (2006.01) | |
| C08F 299/02 | (2006.01) | |
| B01J 31/24 | (2006.01) | |
| B82Y 40/00 | (2011.01) | |
| C08F 232/08 | (2006.01) | |
| C08F 232/04 | (2006.01) | |

(52) U.S. Cl.
CPC ............ *C08J 3/095* (2013.01); *C08F 292/00* (2013.01); *C08F 299/02* (2013.01); *C08K 3/346* (2013.01); *C08K 9/00* (2013.01); *C09K 8/12* (2013.01); *B01J 31/2278* (2013.01); *B01J 31/2404* (2013.01); *B82Y 30/00* (2013.01); *B82Y 40/00* (2013.01); *C08F 232/04* (2013.01); *C08F 232/08* (2013.01); *C08J 2345/00* (2013.01)

(58) Field of Classification Search
None
See application file for complete search history.

(56) References Cited

U.S. PATENT DOCUMENTS

| | | | | |
|---|---|---|---|---|
| 6,867,250 | B1 * | 3/2005 | Gupta | C08K 5/3492 524/100 |
| 2010/0190943 | A1 * | 7/2010 | Busico | C08F 10/00 526/160 |

OTHER PUBLICATIONS

Kalluru et al., "High Viscosity Polymer Gels Derived from Block Copolymer Nanocomposites," Abstract (available Apr. 2017).
(Continued)

*Primary Examiner* — Jeffrey D Washville
(74) *Attorney, Agent, or Firm* — Troutman Pepper Hamilton Sanders LLP (Rochester)

(57) ABSTRACT

The present application is directed to a nanocomposite organo gel having a continuous polymeric network structure, wherein polymer chains are held together by ionic interaction between polymer chain ends, interparticle chain entanglements, layered silicate surface modifier, ionic salt, and layered silicate. The present application is also directed to methods of making and using the nanocomposite organo gel.

10 Claims, 12 Drawing Sheets

(56) References Cited

OTHER PUBLICATIONS

Appel et al., "Self-Assembled Hydrogels Utilizing Polymer-Nanoparticle Interactions," Nature Communications 6(6295):1-9 (2015).
Behling et al., "Hierarchically Ordered Montmorillonite Block Copolymer Brushes," Macromolecules 43:2111-2114 (2010).
Behling et al., "Morphological and Mechanical Behavior of Montmorillonite Grafted Block Copolymer Brushes," Journal of Polymer Science, Part B: Polymer Physics 54:353-361 (2016).
Das et al., "Gel-Nanocomposites: Materials with Promising Applications," Soft Matter 8:2348-2365 (2012).
Kalluru et al., "Synthesis of Polyolefin/Layered Silicate Nanocomposites via Surface-Initiated Ring-Opening Metathesis Polymerization," Macromolecules 46:9324-9332 (2013).
Kojima et al., "Synthesis of Nylon 6-Clay Hybrid by Montmorillonite Intercalated with ε-Caprolactam," Journal of Polymer Science, Part A: Polymer Chemistry 31:983-986 (1993).
Haraguchi et al., "Stimuli-Responsive Properties of Nanocomposite Gels Comprising (2-Methoxyethylacrylate-co-N, N-Dimethylacrylamide) Copolymer-Clay Networks," Macromol. Symp. 329:150-161 (2013).

* cited by examiner

GELS DERIVED FROM POLY(ETHYLIDENE NORBORNENE)-B-POLY(CYCLOPENTENE) BLOCK COPOLYMER NANOCOMPOSITES FOR VISCOSITY MODIFICATIONS AND DRILLING FLUID APPLICATIONS

This application claims the benefit of U.S. Provisional Patent Application Ser. No. 62/726,835, filed Sep. 4, 2018, which is hereby incorporated by reference in its entirety.

FIELD

The present application relates to gels derived from poly(ethylidene norbornene)-b-poly(cyclopentene) block copolymer nanocomposites for viscosity modifications and drilling fluid application.

BACKGROUND

Throughout many decades of research (Ahmed, "Hydrogel: Preparation, Characterization, and Applications: A Review," *J. Adv. Res.* 6:105-121 (2015)), polymeric gels have played an essential role in many applications due to their mechanical and thermal properties (Buchholz et al. "Modern Superabsorbent Polymer Technology," Wiley-VCH (1998)). Polymeric gels are crosslinked macromolecular networks swollen by a fluid phase that can account for well over 99% of the mass of the gel. Unlike most common dry and hard industrial materials, the soft and wet solids like polymeric gels exhibit the capability of undergoing large reversible deformations (Osada et al., "Polymer Gels," *J. Macromol. Sci. Part C: Polymer Reviews* 44(1):87-112 (2004); Osada et al., "Soft and Wet Materials: Polymer Gels," *Adv. Mater.* 10(11):827-837 (1998)). Gels may be categorized in a variety of ways, mainly by the type of polymer, type of fluid and the nature of the crosslinks that bind the polymer chains. These are most often covalent bonds, although a variety of physical mechanisms can lead to crosslinks. Physical crosslinking, such as vitreous domains in a swollen network of block copolymers, can be exploited to develop systems in which the gel state is reversible; that is, the material can transition from an elastic solid to a viscous liquid based on controllable parameters like the temperature.

Polymer nanocomposites are hybrid materials wherein a nanometer-scale inorganic filler is dispersed in an organic polymer matrix. In the solid state, appropriately designed polymer nanocomposites have advantages of improved thermal, mechanical, and barrier properties compared to non-filled polymers (Tanaka et al, "Novel Hydrogels With Excellent Mechanical Performance," *Prog. Polym. Sci.* 30(1):1-9 (2005); Liu et al., "High Clay Content Nanocomposite Hydrogels With Surprising Mechanical Strength and Interesting Deswelling Kinetics," *Polymer* 47(1):1-5 (2006)). Nano-clay based inorganic fillers have found wide usage because of their established intercalation chemistry, good cation exchange capacity, and natural availability (Kalluru et al., "Synthesis of Polyolefin/Layered Silicate Nanocomposites via Surface-Initiated Ring-Opening Metathesis Polymerization," *Macromolecules* 46(23):9324-9332 (2013)). Clay fillers are distinct from fibers or particulate fillers in that they are nearly two-dimensional, with a discoidal morphology typically comprising a thickness of 1 nm and a diameter of around 500 nm. Some time ago, it was discovered that exfoliated clay particles, which bear an anionic surface charge, could serve as large physical crosslinks to bind polymers bearing cationic end-groups. The resultant "nanocomposite gels" were found to have superior mechanical properties compared to other polymeric gels (Haraguchi et al., "Mechanical Properties and Structure of Polymer-Clay Nanocomposite Gels With High Clay Content," *Macromolecules* 39(5):1898-1905 (2006); Meneghetti et al., "A Collection of Papers From the 32nd Conference of North American Thermal Analysis Society," *Thermochim. Acta* 442:74-77 (2006)). These nanocomposite gels have been studied widely for chemical, physical, and biological applications, including cell immobilization (Ding et al., "A Bio-Inspired Support of Gold Nanoparticles-Chitosan Nanocomposites gel for Immobilization and Electrochemical Study of K562 Leukemia Cells," *Biomacromolecules* 8:1341-1346 (2007)), drug release and delivery (Lee, "Effect of Bentonite on the Physical Properties and Drug-Release Behavior of Poly(AA-Co-PEGMEA)/Bentonite Nanocomposite Hydrogels for Mucoadhesive," *J. Appl. Polym. Sci.* 91:2934-2941 (2004); Satarkar et al., "Magnetic Hydrogel Nanocomposites for Remote Controlled Pulsatile Drug Release," *J. Controlled Release* 130(3):246-251 (2008); Oh et al., "The Development of Microgels/Nanogels for Drug Delivery Applications," *Prog. Polym. Sci.* 33:448-477 (2008)), electro-chemistry (Deka et al., "Electrical and Electrochemical Studies of Poly(Vinylidene Fluoride)-Clay Nanocomposite Gel Polymer Electrolytes for Li-Ion Batteries," *J. Power Sources* 196:1358-1364 (2011); Deka et al., "Enhanced Electrical and Electrochemical Properties of PMMA-Clay Nanocomposite Gel Polymer Electrolytes," *Electrochim. Acta* 55:1836-1842 (2010)), tissue engineering (Kai et al., "Mechanical Properties and in vitro Behavior of Nanofiber-Hydrogel Composites for Tissue Engineering Applications," *Nanotechnology* 23:095705 (2012)), and antibacterial materials (Murthy et al., "First Successful Design of semi-IPN Hydrogel-Silver Nanocomposites: a Facile Approach for Antibacterial Application," *J. Colloid Interface Sci.* 318(2):217-224 (2008); Grande et al., "Nanocomposites of Bacterial Cellulose/Hydroxyapatite for Biomedical Applications," *Acta Biomater.* 5:1605-1615 (2009)).

The most common method for preparation of the nanocomposite gel can be found in Haraguchi et al., "Effects of Clay Content on the Properties of Nanocomposite Hydrogels Composed of Poly(N-Isopropylacrylamide) and Clay," *Macromolecules* 35(27): 10162-71 (2002). These gels are usually formed via covalent crosslinking to a network structure (Schexnailder et al., "Nanocomposite Polymer Hydrogels," *Colloid. Polym. Sci.* 287:1-11 (2009)), which is known as chemical gelation (Osada et al., "Polymer Gels," *J. Macromol. Sci. Part C: Polymer Reviews* 44(1):87-112 (2004)). In this case, the nanocomposite gel is comprised of both physical crosslinks owing to the polymer/clay interaction as well as permanent chemical crosslinks, and the material may be viewed as a traditional gel with mechanical reinforcement from the clay particles. Haraguchi et al., "Effects of Clay Content on the Properties of Nanocomposite Hydrogels Composed of Poly(N-Isopropylacrylamide) and Clay," *Macromolecules* 35(27):10162-71 (2002)) discovered that under certain conditions the need for chemical crosslinking could be eliminated such that only the clay particles served as crosslinking sites, mediated by the interaction between the anionic clay surface and cationic end-groups of the polymer phase. In this system, polymers grow from the particle surface by initiating a catalyzed uncontrolled radical polymerization; a termination-by-combination event between two polymer radicals on neighboring particles tethers polymer-clay sheets to form a network structure (Haraguchi et al., "Effects of Clay Content on the Properties of Nanocomposite Hydrogels Composed of Poly (N-Isopropylacrylamide) and Clay," *Macromolecules* 35(27):10162-71(2002); Haraguchi et al., "Nanocomposite Hydrogels: A Unique Organic-Inorganic Network Structure with Extraordinary Mechanical, Optical, and Swelling/Deswelling Properties," *Adv. Mater.* 14:1120-1124 (2002); Haraguchi et al., "Mechanism of Forming Organic/Inorganic Network Structures during In-Situ Free-Radical Polymerization in PNIPA-Clay Nanocomposite Hydrogels," *Macromolecules* 38(8):3482-90 (2005)). As a result, the clay particle serves as a multifunctional crosslinker through ionic bonding between the particle surface, catalyst and the persulfate, and the composite material behaves as a solid elastic network. Due to the strong ionic interactions, the network cannot relax stress and is persistent even when subjected to excess solvent or elevated temperature. Accordingly, the gelled state is irreversible in all known polymer nanocomposite gels and is unable to be used in applications where switchable gel-like properties are desirable.

The present application is directed to overcoming these and other deficiencies in the art.

SUMMARY

One aspect of the present application relates to a nanocomposite organo gel having a continuous polymeric network structure, wherein polymer chains are held together by dynamic inter/intraparticle chain entanglements and ionic interaction between polymer chain ends, terminating in surface modifier, ionic salt, and layered silicate.

Another aspect of the present application relates to a method of making a nanocomposite organo gel. This method includes: providing a polymer nanocomposite; providing an ionic salt; and dissolving the block copolymer nanocomposite along with the ionic salt in a solvent under conditions effective to produce the nanocomposite organo gel.

Another aspect of the present application relates to a fracking fluid composition. The fracking fluid composition comprises: an oil- or water-based liquid; sand; and the nanocomposite organo gel of the present application.

Another aspect of the present application relates to a method for preparing a fracking liquid. The method comprises: mixing the nanocomposite organo gel of the present application with an oil- or water-based liquid and sand.

A new class of nanocomposite organo gels was discovered by dissolving a block copolymer nanocomposite along with an ionic salt in tetrahydrofuran solvent. The resultant nanocomposite (NC) gels are viscoplastic materials at solids loading as low as 0.5 (w/v) %. The NC gels were studied for their rheological characteristics by varying the type of ionic salt, salt loading, and polymer loading. NC gels rheological properties suggest that they deform as an elastic solid for stresses below a yield stress, and flow as shear thinning viscoelastic fluids for applied stresses exceeding the yield point. Transmission electron microscopy micrographs showed that the NC gels have a continuous network structure even after removing the solvent. It is believed that the viscoplastic gel formation is the result of formation of a dynamic interpenetrating network structure influenced by montmorillonite (MMT) clay in the nanocomposite, block copolymer, surface modifier, and the ionic salt. The ionic salt facilitates chain exchange between neighboring clay particles, leading to interparticle chain entanglements that act as dynamic crosslinks. It is believed that in-depth research and development of these newly found NC gels could lead to interesting applications in the field of viscosity modifiers.

A polymeric nanocomposite material that can form high viscoplastic gels in tetrahydrofuran (THF) solvent was developed. The mechanism of gel formation that was observed is entirely different from the already known clay-based gel systems. First, the gel formation is not a result of chemical coupling or crosslinking, which is the usual case of nanocomposite hydrogel formation to date. Second, the gel formation does not occur in situ during the polymerization, for example as reported by Haraguchi et al., "Mechanism of Forming Organic/Inorganic Network Structures during In-Situ Free-Radical Polymerization in PNIPA-Clay Nanocomposite Hydrogels," *Macromolecules* 38(8): 3482-90 (2005), which is hereby incorporated by reference in its entirety. In the present application, the nanocomposite polymeric material was synthesized as a thermoplastic and then gel was reversibly formed by mixing it in THF in presence of an ionic salt. The presumptive mechanism for gel formation would be the formation of a network structure between clay, ionic salt, and polymer chains. It is believed that the type of synthetic route used for making these nanocomposite materials, which gives exfoliated clay structures, serves as the prerequisite form needed for a mechanically stable gel structure. Polymer nanocomposites are usually synthesized via melt blending, solution blending, and in situ polymerization techniques (Paul et al., "Polymer Nanotechnology: Nanocomposites," *Polymer* 49:3187-3204 (2008); LeBaron et al., "Polymer-Layered Silicate Nanocomposites: an Overview," *Appl. Clay Sci.* 15:11-29 (1999), which are hereby incorporated by reference in their entirety). Depending on the type of synthesis route being used, different degrees of inorganic filler dispersion were observed in the polymer matrix. In situ polymerization is the most favored route to achieve a highly dispersed (exfoliated) state of nano filler in a polymer matrix. A surface initiated ring opening metathesis polymerization (SI-ROMP) technique was successfully employed for growing a diblock copolymer from the surface of montmorillonite (MMT) clay (Kalluru et al., "Synthesis of Polyolefin/Layered Silicate Nanocomposites via Surface-Initiated Ring-Opening Metathesis Polymerization," *Macromolecules* 46(23):9324-9332 (2013), which is hereby incorporated by reference in its entirety). In the present application the same synthesis procedure was adopted for poly(ethylidene norbornene-b-cyclopentene), and this material was used to form the high viscosity gels. High viscosity gels were formed with very low solids loading the clay grafted poly(ethylidene norbornene)-b-poly(cyclopentene) (SI-BCP).

The polymeric materials synthesized in accordance with the present application are highly hydrophobic. The hydrophobic materials showing the above mentioned characteristics are believed to have applications as viscosity modifiers in oils, such as oil-based muds for drilling fluids used in the development of oil and natural gas wells. It is believed that hydrophilic gels would also have a broad impact and wide application range. It is also believed that by developing water soluble polymers via a surface initiated polymerization route, it will be possible to synthesize high viscosity gels. Moreover, it is believed that compositions that form gels could be produced by forming the nanocomposite by melt compounding or solution blending with a cationically-functionalized block copolymer. These nanocomposite materials are expected to have applications as thickening materials in either oil- or water-based hydraulic fracking fluids, and as viscosity modifiers at a very low polymer loading compared to present alternative materials.

BRIEF DESCRIPTION OF THE DRAWINGS

In FIG. 1A, the salt cation (in this case sodium ions) exchange with the cationic alkyl ammonium head of the diblock copolymer (poly(ethylidene norbornene)-b-poly(cyclopentene), black and grey curves), which is attracted to the anionic surface of the montmorillonite clay particle (gray rectangle). FIG. 1B illustrates the entangled state of two poly(cyclopentene) blocks as an exchanged poly(ethylidene norbornene) block enters the solution phase. FIG. 1C depicts the formation of interparticle crosslinks as the cationic end groups of two poly (ethylidene norbornene) blocks exchange with free cations on the surfaces of neighboring clay particles. The block lengths are not to scale.

DETAILED DESCRIPTION

Figures 1A, 1B, 1C:
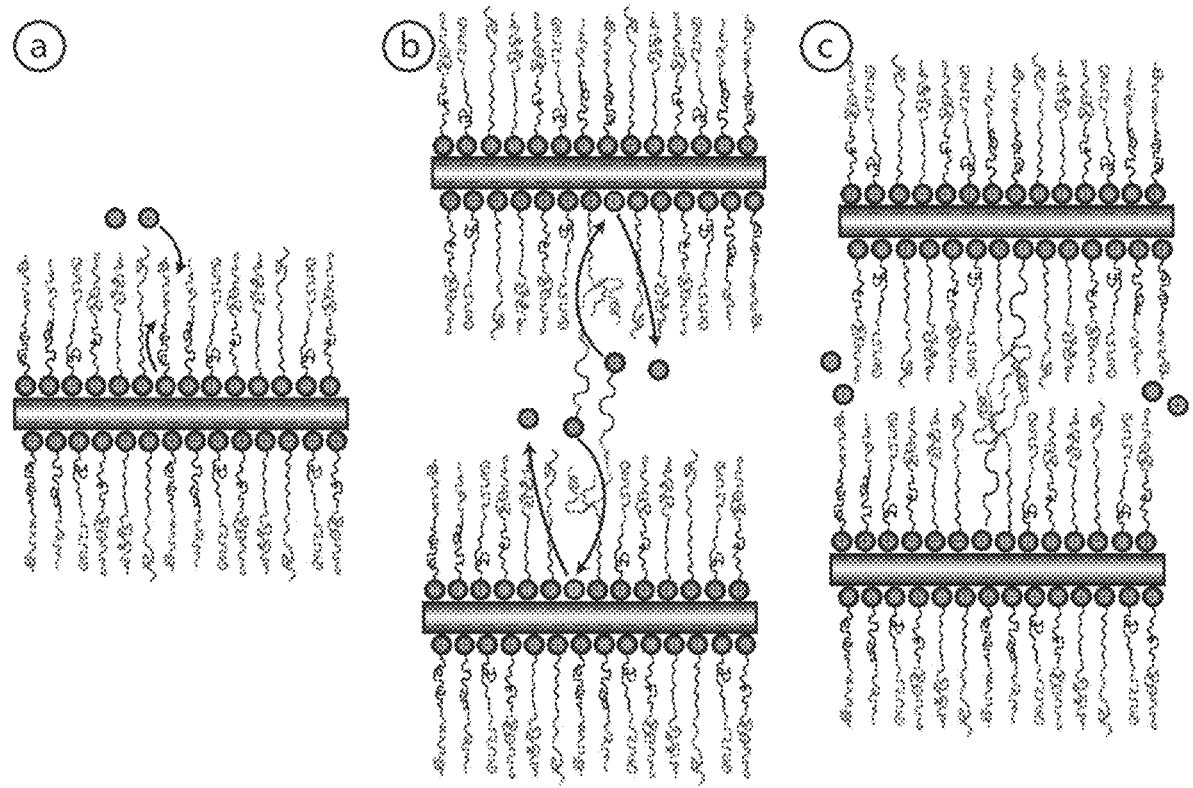
FIGS. 1A-1C are presumptive cartoons showing the mechanism of gel formation.

One aspect of the present application relates to a nanocomposite organo gel having a continuous polymeric network structure, wherein polymer chains are held together by inter/intraparticle chain entanglements and ionic interaction between polymer chain ends terminating in surface modifier, ionic salt, and layered silicate.

In one embodiment, the continuous polymeric network is an inter-penetrating polymeric network.

In another embodiment, the polymeric matrix is a block copolymer.

In another embodiment, the polymeric matrix comprises at least one PA block and at least one PB block, wherein PA represents a polymer block comprising one or more units of monomer A and PB represents a polymer block comprising one or more units of monomer B.

In yet another embodiment, the nanocomposite organo gel is thermoplastic.

Another aspect of the present application relates to a method of making a nanocomposite organo gel. This method includes: providing a polymer nanocomposite; providing an ionic salt; and dissolving the block copolymer nanocomposite along with the ionic salt in a solvent under conditions effective to produce the nanocomposite organo gel.

In one embodiment, the nanocomposite organo gel has a continuous polymeric network structure, wherein polymer chains are held together by ionic interaction between polymer chain ends, interparticle chain entanglements, layered silicate surface modifier, ionic salt, and layered silicate.

In another embodiment, the nanocomposite organo gel retains its structure after the solvent is removed.

The formation of the nanocomposite organo gel does not occur in situ during the polymerization. In the present application, the nanocomposite polymeric material was synthesized as a thermoplastic and then gel was reversibly formed by mixing it in a suitable solvent in presence of an ionic salt.

In one embodiment, the polymer nanocomposite is a block copolymer nanocomposite.

The polymer nanocomposite can be dissolved in a suitable solvent. Addition of a suitable ionic salt to the solution results in formation of nanocomposite organo gel. This reaction can be carried out at temperatures below 40° C., for example, about 15-30° C., or 18-25° C., or at 20° C.

Suitable solvents that can be used in accordance with the present application to produce the nanocomposite organo gel include THF, glycerol, water, and mineral oil.

Suitable ionic salts that can be used in accordance with the present application include, but are not limited to, NaCl, KCl, LiCl, $MgCl_2$, and $CaCl_2$.

The nanocomposite organo gel of the present application can have different amounts of polymer nanocomposite, solvent, and ionic salt. The polymer nanocomposite to solvent ratio ((w/v) %) and ionic salt (polymer based) (wt %) are 0.3 to 30 (w/v) % and 1 to 100 wt %, respectively. The polymer nanocomposite to solvent ratio ((w/v) %) and ionic salt (polymer based) (wt %) are 0.3 to 30 (w/v) % and 1 to 50 wt %, respectively. Alternatively, the polymer nanocomposite to solvent ratio ((w/v) %) and ionic salt (polymer based) (wt %) are 0.3 to 5 (w/v) % and 5 to 20 wt %, respectively. In another alternative, the polymer nanocomposite to solvent ratio ((w/v) %) and ionic salt (polymer based) (wt %) are 0.5 to 5 (w/v) % and 10 to 20 wt %, respectively.

In one embodiment, the polymer nanocomposite to solvent ratio ((w/v) %) and ionic salt (polymer based) (wt %) are 1 (w/v) % and 15 wt %, respectively.

The nanocomposite organo gel can have different amounts of PA block and PB block. The weight fractions of the PA block and the PB block in the polymer nanocomposite can range from 0.05 to 0.95 for the PA block and from 0.05 to 0.95 of the PB block. Alternatively, weight fractions of the PA block and the PB block in the polymer nanocomposite range: from 0.1 to 0.9 for the PA block and from 0.1 to 0.9 of the PB block; from 0.2 to 0.8 for the PA block and from 0.2 to 0.8 of the PB block; from 0.3 to 0.7 for the PA block and from 0.3 to 0.7 of the PB block; from 0.4 to 0.7 for the PA block and from 0.4 to 0.7 of the PB block. Further, weight fractions of the PA block and the PB block in the polymer nanocomposite range from 0.35 to 0.65 for the PA block and from 0.35 to 0.65 of the PB block.

The molecular weight (MW) of the block copolymer can range from 10 kDa to 500 kDa. Alternatively, from 50 kDa to 400 kDa, from 75 kDa to 350 kDa, from 100 kDa to 300 kDa, from 100 kDa to 250 kDa, from 100 kDa to 200 kDa, and from 105 kDa to 160 kDa.

The ratio of the viscosity of the nanocomposite organo gel to that of the solvent can range from 10 to 1,000,000 Pa·s at room temperature. Alternatively, the ratio of viscosity of the polymer nanocomposite gel to that of the solvent at room temperature ranges from 1,000 to 500,000 Pa·s, ranges from 20,000 to 250,000 Pa·s, ranges from 25,000 to 150,000 Pa·s, ranges from 30,000 to 125,000 Pa·s, or ranges from 50,000 to 100,000 Pa·s.

In one embodiment, the nanocomposite organo gel is thermoplastic.

In at least one embodiment, the providing a polymer nanocomposite comprises: providing a modified layered silicate; providing a monomer A; providing a monomer B; and polymerizing the monomer A and the monomer B on the surface of the modified layered silicate under conditions effective to produce the polymer nanocomposite.

According to the present application, polymerization of the monomer A and the monomer B on the surface of the modified layered silicate can be conducted using surface initiated ring opening metathesis polymerization (SI-ROMP), surface initiated atom transfer radical polymers and surface initiated nitroxide-mediated polymerization.

In at least one embodiment, polymerizing is carried out using surface initiated ring opening metathesis polymerization (SI-ROMP).

The modified layered silicate can be dispersed in a suitable solvent and then suitable catalyst can be added to the mixture. After that, a solution of monomer A in a suitable solvent and a solution of monomer B in a suitable solvent can be added sequentially.

Suitable monomers that can be used as monomer A and monomer B according to the present application are cyclic olefins: monounsaturated monocyclic olefins, monocyclic dienes, and bicyclic and polycyclic olefins.

Suitable monounsaturated monocyclic olefins include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxycyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

Suitable monocyclic dienes include, without limitation, 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, and substituted analogs thereof.

Suitable bicyclic and polycyclic olefins include, without limitation, dicyclopentadiene (DCPD); trimer and other higher order oligomers of cyclopentadiene including without limitation tricyclopentadiene (cyclopentadiene trimer), cyclopentadiene tetramer, and cyclopentadiene pentamer; ethylidenenorbornene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5,6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene; 8-cyanotetracyclododecene; pentacyclopentadecene; pentacyclohexadecene; and the like, and their structural isomers, stereoisomers, and mixtures thereof. Additional examples of bicyclic and polycyclic olefins include, without limitation, $C_{2-12}$ hydrocarbyl substituted norbornenes such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like.

More preferred cyclic olefins include cyclopentene, dicyclopentadiene; tricyclopentadiene; dicyclohexadiene; norbornene; ethylidene norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_{2-12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. Even more preferred cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_{2-12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like.

In one embodiment, monomer A is selected from the group consisting of ethylidene norbornene and cyclopentene.

In another embodiment, monomer B is selected from the group consisting of ethylidene norbornene and cyclopentene.

Suitable solvents include organic, protic, or aqueous solvents, such as aromatic hydrocarbons, chlorinated hydrocarbons, ethers, aliphatic hydrocarbons, alcohols, water, or mixtures thereof. Preferred solvents include benzene, toluene, p-xylene, methylene chloride, dichloromethane, 1,2-dichloroethane, dichlorobenzene, chlorobenzene, tetrahydrofuran, diethylether, pentane, methanol, ethanol, water, and mixtures thereof.

In one embodiment, the suitable solvent is dichloromethane.

Suitable catalysts include first Generation Grubbs-type catalysts, second Generation Grubbs-type catalysts, third Generation Grubbs-type catalysts, Hoveyda-Grubbs' catalyst, and others as described in U.S. Pat. No. 9,234,985 to Grubbs et al., which is hereby incorporated by reference in its entirety.

In one embodiment, the polymerizing is carried out in the presence of a Grubbs catalyst.

In another embodiment, the Grubbs' catalyst is a Grubbs' $1^{st}$ generation catalyst.

In another embodiment, the Grubbs' catalyst is a Grubbs' $3^{rd}$ generation catalyst.

In yet another embodiment, polymerizing is carried out in the presence of a co-catalyst.

In a further embodiment, the co-catalyst is triphenylphosphine or tricyclohexylphosphine.

The polymerization reaction can be performed at temperatures below 300° C., for example, from −100 to 300° C., from −80 to 250° C., from −60 to 250° C., from −40 to 250° C., from −20 to 250° C., from −10 to 200° C., from 0 to 150° C., from 10 to 200° C., from 10 to 150° C., from 10 to 100° C., from 10 to 80° C., from 10 to 60° C., from 10 to 40° C., and from 10 to 30° C.

The polymerization reaction time may usually range from less than one minute to 10 hours or more.

The polymerization reaction can be terminated with a suitable terminating agent. Terminating agents that can be used according to the present application include, but are not limited to, aldehydes, symmetrical internal olefins, vinyl ethers, or combinations thereof. In one embodiment, the termination agent is ethyl vinyl ether or propionaldehyde, or combination thereof.

In at least one embodiment, the providing a modified layered silicate comprises: providing a layered silicate; providing a surfactant; and functionalizing the layered silicate with the surfactant under conditions effective to produce the modified layered silicate.

Suitable layered silicates include are phyllosilicates. The layered silicate materials can be smectite clay minerals such as montmorillonite, nontronite, biedellite, volkonskonite, hectorite, saponite, sauconite, sobockite, stevensite, and svinfordite. Commercially available montmorillonite materials are available from Southern Clay Products, Inc. under the tradename Cloisite®. Cloisite® Na⁺ is a natural montmorillonite that does not contain an organic modifier. Cloisite® 15A and Cloisite® 25A are natural montmorillonites that have been modified with quaternary ammonium salts.

In one embodiment, the layered silicate is montmorillonite (MMT) clay.

In another embodiment, the surface of layered silicate is modified to change the layered silicate's surface properties or interlayer distance.

A layered silicate can be treated with an organic compound, a modifying agent to make the layered silicate surface more compatible with systems of low-to-medium polarity. Examples of this are treatments with a quaternary ammonium salt, such as dimethylbenxylalkylammonium chloride, that can be further functionalized with Grubbs' catalyst (Kalluru et al., "Synthesis of Polyolefin/Layered Silicate Nanocomposites via Surface-Initiated Ring-Opening Metathesis Polymerization," *Macromolecules* 46(23): 9324-9332 (2013), which is hereby incorporated by reference in its entirety) or treatment with halogenated alkyl ammonium surfactants (Behling at al., "Morphological and Mechanical Behavior of Montmorillonite Grafted Block Copolymer Brushes," *Journal of Polymer Science* Part B: Polymer Physics 54(2):353-361 (2016), which is hereby incorporated by reference in its entirety). Further, in forming a polymer nanocomposite with a layered silicate like montmorillonite, an ionic hydrophobicizer can replace metal cations between the constituent layers of the layered silicate, pushing the layers farther apart.

Typically, the modifying agents are organic compounds derived from oxonium, ammonium, phosphonium or sulfonium ions, which may carry one or more organic radicals. Quaternary ammonium salts are commonly used.

The surface of the layered silicate can be modified by using a suitable modifying agent, such as a surfactant, to prepare the modified layered silicate. In this embodiment, the surfactant ion exchanges onto the silicate surface, thus modifying its hydrophilic nature.

Suitable surfactants include alkyl ammonium surfactants, imidazolinium salts, and ethoxylated fatty amines.

In one embodiment, the surfactant is alkyl ammonium surfactant. Suitable surfactants include 2,5,6-di(11-(N,N,N-trimethylammonium)undecoxycarbonyl)norbornene, tetramethylammonium acetate, tetrabutylammonium hydrogen sulfate, dodecyltrimethylammonium chloride, benzalkonium chloride, tetramethylammonium fluoride, dioctadecyl dimethyl ammonium chloride, N-hexadecyltrimethylammonium chloride, benzyltriethylammonium chloride, tetraethylammonium bromide, trimethyl stearylammonium chloride, tetrabutylammonium perchlorate, stearyldimethylbenzylammonium chloride, alkyl dimethylbenzylammonium chloride, tetradecyl dimethylbenzylammonium chloride, octadecyl dimethylbenzylammonium chloride, methyl trioctyl ammonium chloride, dioctyl dimethyl ammonium chloride, di(octyl-decyl) dimethyl ammonium chloride, didecyl dimethyl ammonium chloride, dihexadecyl dimethyl ammonium chloride, distearyl dimethyl ammonium chloride, di(hydrogenated tallow) dimethyl ammonium chloride, tetramethylammonium iodide, tetrabutyl ammonium chloride, dodecyl trimethyl ammonium bromide, tridodecyl methyl ammonium chloride, benzyl-$C_{12-14}$-alkyldimethyl chlorides, tetrabutylammonium cyanoborohydride, alkyl dimethyl benzyl ammonium chloride (n=14), behenyl trimethyl ammonium chloride, benzyltrimethylammonium iodide, tetrabutylammonium chloride monohydrate, dicoco dimethyl ammonium chloride, octadecylamine N-oleoyl sarcosinate, N,N-dihexadecyl-N-methyl-1-hexadecanaminium chloride, tetramethylammonium fluoride tetrahydrate, tetrabutylammonium fluoride, dimethyldioctadecylammonium bromide, tetramethylammonium sulfate, octadecyl trimethyl ammonium bromide, octadecyl trimethyl ammoniumchloride, tallow alkyl diamine dioleate, and coconut alkyl diamine adipate.

In one embodiment, the surfactant is 2,5,6-di(11-(N,N,N-trimethylammonium)-undecoxycarbonyl)norbornene.

Another embodiment relates to a viscosity modifier comprising the nanocomposite organo gel of the present application.

Another aspect of the present application relates to a fracking fluid composition. The fracking fluid composition comprises: an oil- or water-based fluid; sand; and the nanocomposite organo gel of the present application.

A typical recipe for a water based fracking fluid comprises about 90% water, about 8-9% sand, and about 1-2% other chemicals such as biocides, acids, inhibitors, stabilizers, crosslinkers, friction reducers, pH adjusting agents, iron control, surfactants, and gelling agents.

An oil-based fracking fluid comprises hydrocarbon liquid, hydrocarbon based oil, crude oil, or thickened crude oil and about other chemicals such as biocides, acids, inhibitors, stabilizers, crosslinkers, friction reducers, pH adjusting agents, iron control, surfactants, water, sand, and gelling agents.

The nanocomposite organo gel of the present application can be used as a substitute for the gelling agents such as guar gum, can serve as a thickening agent for water, as a crosslinking agent, as a pH adjusting agent, as a breaking agent, or as a biocide.

Another aspect of the present application relates to a method for preparing a fracking liquid. The method comprises: mixing the nanocomposite organo gel of the present application with water and sand.

EXAMPLES

Example 1—Synthesis Procedure

Figure 2:
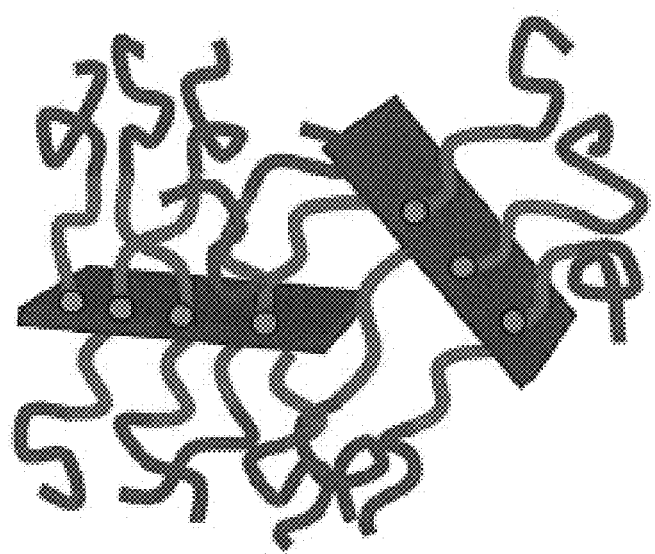
FIG. 2 is a schematic showing exfoliated nanocomposite synthesized by surface modification of clay (surfactant-dots), then forming block copolymers using surface initiated ROMP of ethylidene norbornene (grey lines) and cyclopentene (dark grey lines).

The nanocomposite material used to form nanocomposite gels was synthesized via surface initiated ring opening metathesis polymerization (SI-ROMP) of poly(ethylidene norbornene)[P(Enbn)], as the inner block and poly(cyclopentene)[P(Cpe)], as the outer block. The nanocomposite is fully exfoliated as depicted by FIG. 2. The synthesis started by modifying the surface of MMT clay by using previously prepared alkyl ammonium surfactant (2,5,6-di(11-(N,N,N-trimethylammonium)undecoxycarbonyl)-norbornene) to make the clay compatible with the polymer (Kalluru et al., "Synthesis of Polyolefin/Layered Silicate Nanocomposites via Surface-Initiated Ring-Opening Metathesis Polymerization," *Macromolecules* 46(23):9324-9332 (2013), which is hereby incorporated by reference in its entirety). When MMT clay (Na+-Cloisite) is mixed with alkyl ammonium surfactant, the surfactant ion exchanges onto the clay surface thus modifying its hydrophilic nature. The organo-modified clay or functionalized clay (fMMT) was initiated with Grubbs' $1^{st}$ generation catalyst to start the polymerization process. Sequential addition of ethylidene norbornene and cyclopentene monomers to this mixture synthesized the desired nanocomposite block copolymer. The synthesis procedure used for poly(ethylidene norbornene-b-poly(cyclopentene) block copolymer nanocomposite is similar to one described in detail in Kalluru et al., "Synthesis of Polyolefin/Layered Silicate Nanocomposites via Surface-Initiated Ring-Opening Metathesis Polymerization," *Macromolecules* 46(23):9324-9332 (2013), which is hereby incorporated by reference in its entirety. The targeted SI-BCP materials for forming NC gels had clay loading of 3 wt %, block copolymer molecular weight (MW) of 150 kDa, and block composition of 0.62 for P(Enbn) and 0.38 for P(Cpe). The synthesized nanocomposite block copolymer material was dissolved in tetrahydrofuran (THF) at different polymer weight percentages with different salt loadings (Table 1). The NC weight fraction was varied from 0 to 1.5 (w/v %) and the salt weight fraction was varied from 0 to 100 (NC weight basis, wt %).

TABLE 1

Nano Composite Gels Derived by Mixing Different Amounts of NC (w/v %) in 35 mL of THF Along With Different Sodium Chloride Salt Loading (wt %)

| w/v, % | wt, % |
|---|---|
| 0.1 | 15 |
| 0.25 | 15 |
| 0.5 | 15 |
| 0.75 | 15 |
| 1 | 5 |
|  | 10 |
|  | 15 |
|  | 20 |
|  | 30 |
|  | 50 |
|  | 70 |
|  | 100 |
| 1.5 | 15 |

The salt loading is calculated based on the NC loading.

Example 2—Transmission Electron Microscopy (TEM)

The morphology of NC gel sample was imaged using Transmission electron microscopy (TEM). The sample was prepared by placing a small amount of gel on specimen grid where controlled drying over 30 min removed all of the solvent. This sample was imaged using FEI-Tecnai 2-F20 STEM microscope operating at 120 keV. Images were taken from different parts of the section to ensure homogeneity and images were analyzed in a Gatan Digital micrograph suite.

Example 3—Rheological Study

Rheological properties of NC gels were measured by using a TA ARES® G2 strain-controlled rheometer with 8 mm SS parallel plates configuration for obtaining the temperature ramp measurements. Temperature ramp test was carried out from −100 to −20° C. at a rate of 3° C./min heating rate and w=1 rad/s in nitrogen atmosphere. For obtaining viscosity data, APS (Advanced Peltier System) attachment on TA ARES® G2 instrument with a cup and recessed bob geometry was used. The temperature control on the APS was achieved by using a water cooled chiller. Nearly 7 ml of NC gel was used in the geometry at room temperature and shear rate was varied from 0.01 l/s to 10 l/s. Stress relaxation tests were conducted on samples with 1 w/v % NC and two different salt loadings using 8 mm parallel plate geometry at 18° C. and 15% strain. Samples were kept wet by adding THF at 0.03 mL/min rate during the course of measurements.

Example 4—Materials Synthesis

The NC gels were formed with SI-BCP material with sodium chloride salt and THF. When a nanocomposite was dissolved in THF solvent, polymer chains get solvated and dissolve in the solvent. When a salt (e.g., NaCl, $MgCl_2$, or LiCl) was added to this solution, the cations (from ionic salt) exchanged onto the surface of clay replacing the polymer chain which were attached to clay surface via an alkyl ammonium surfactant. Thus, the polymeric chains were much more liberated and free to move in the THF solution.

The dynamics of chain liberation are influenced by the block composition, as the poly(ethylidene norbornene) block must diffuse through a thermodynamically repulsive poly(cyclopentene) block to reach the solvent matrix. This diffusive process is further complicated by chain entanglements, particularly in the outer poly(cyclopentene) rich domain of a nanocomposite particle. It is believed that for a certain block composition and molecular weight of the diblock in a nanocomposite, the presence of clay, addition of ionic salt, and the polymer chain with alkyl ammonium surfactant properly balance these chain exchange dynamics such that the cationic chain end of a chain can re-associate with a new clay particle while still entangled with the polymers in its originally associated particle. These interparticle chain entanglements are all believed to create a dynamic interparticle network, resulting in the observed viscoplastic nanocomposite gel. A pictorial representation of this mechanism in presented in the FIGS. 1A-1C. In order to further understand the effects of polymer and salt loading on NC gel formation, some NC gel samples were prepared by varying solids loading and conducted rheological measurements as reported in the results section below.

Example 5—Gel Tests

Figure 3:
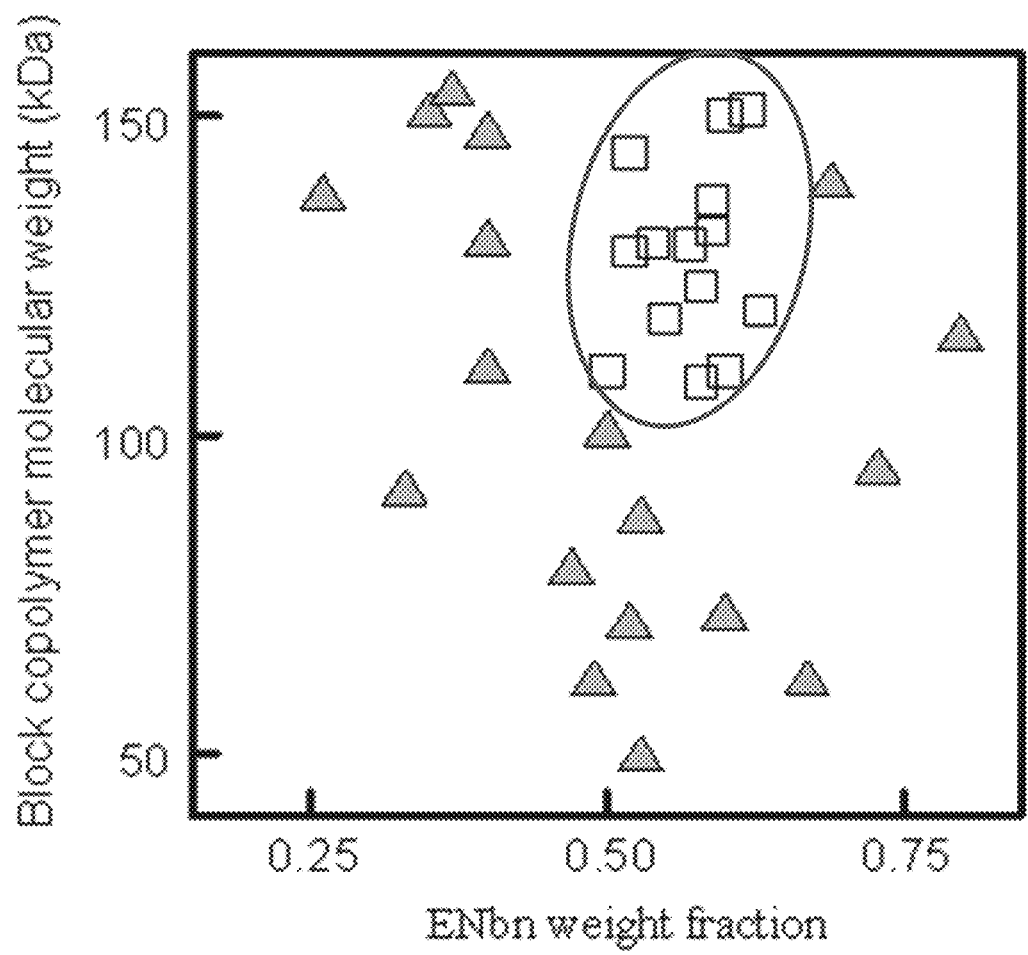
FIG. 3 is a phase graph of SI-BCPs that formed gel (gray triangle) and did not form gel (blank rectangle) with 1 (w/v) % polymer and 15 wt % salt (polymer weight basis).

As mentioned before, certain block composition and molecular weight could be one factor that affects the gel formation. FIG. 3 summarizes the gel test results on different SI-BCP molecular weights with different di-block composition. Each SI-BCP was tested on 1 (w/v) % of SI-BCP to THF ratio, with 15 wt % NaCl (polymer based). In the range from 105 kDa to 160 kDa MW, the gel formed when ENbn weight fractions were between 0.5 to 0.65. Other than that range, low or high ENbn weight fraction will not cause the SI-BCPs to form gel. In the range from 40 kDa to 100 kDa MW, no gel formation with the ENbn weight fraction range from 0.3 to 0.75. Therefore, the gel only formed at certain ENbn weight fraction range and certain di-block molecular weight.

Gel network is formed because of tethering/de-tethering of BCP chains from MMT clay surface which is strongly influenced by the block composition.

Figure 11:
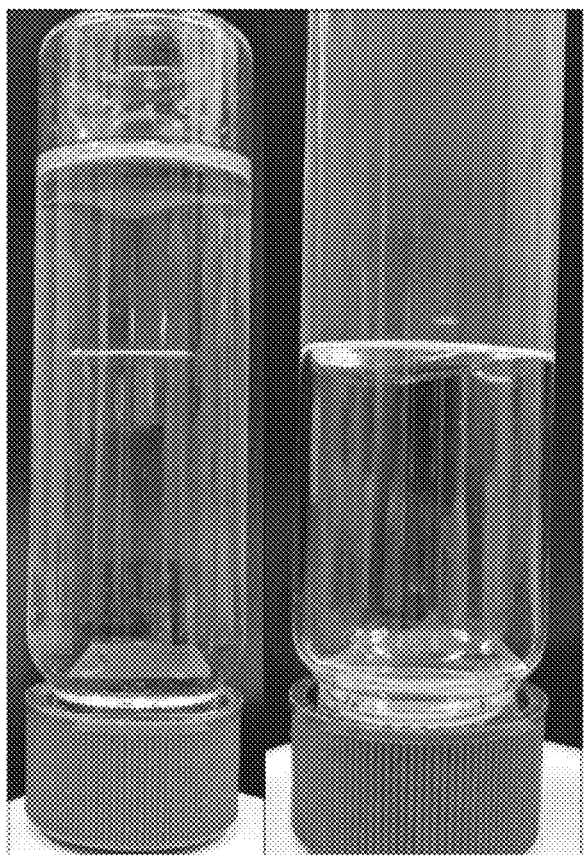
FIG. 11 is an image showing the difference between a sample (1.5 w/v % nanocomposite and 0 wt % salt) that did not form gel and a gel sample (1.5 w/v % nanocomposite and 15 wt % salt).

The first block must diffuse through a thermodynamically repulsive second block to reach the solvent matrix, which is further complicated by chain entanglements. FIG. 11 shows two samples, one with salt (right) and one without salt where the samples were stored in capped vials. Gel sample with salt does not flow and shows some opacity owing to the suspended state of nano-clay (filler) in the solvent. It was observed that the gel was very cohesive in nature and maintains physical stability until upon acted by an external force. The sample without salt did not form a gel even after 120 hours. The picture shows inverted vials to show flow characteristics of both samples.

Example 6—Characterization

Morphological and rheological characterization techniques were used to understand the mechanism leading to the formation of NC gels and ascertain the gel properties. It was observed that the gel was very cohesive in nature and maintains physical stability until upon acted by an external force.

Example 7—Transmission Electron Microscope (TEM) Imaging

Figure 4:
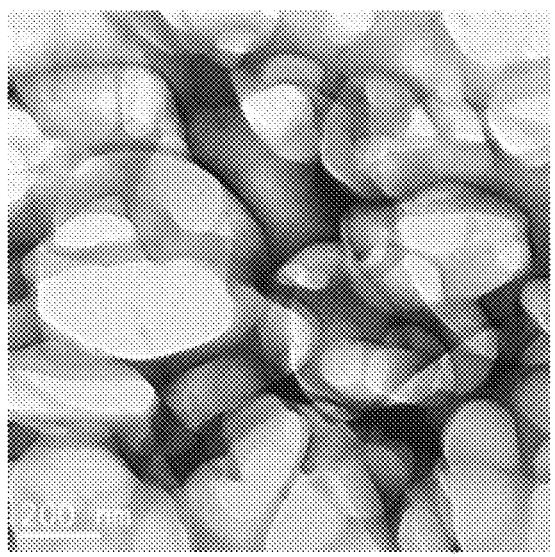
FIG. 4 is a TEM micrograph showing a thin section image of nanocomposite gel at room temperature.

FIG. 4 shows the NC gel structure after all the solvent has evaporated. It was observed that the material did not degrade after exposing it to TEM electron beam for an hour. The nanocomposite material seems to have created an interpenetrating network in the solvent and retained its structure after solvent evaporation. The structure is sponge like but is rigid enough to not collapse after solvent was removed.

Example 8—Rheology Measurement

Figure 5:
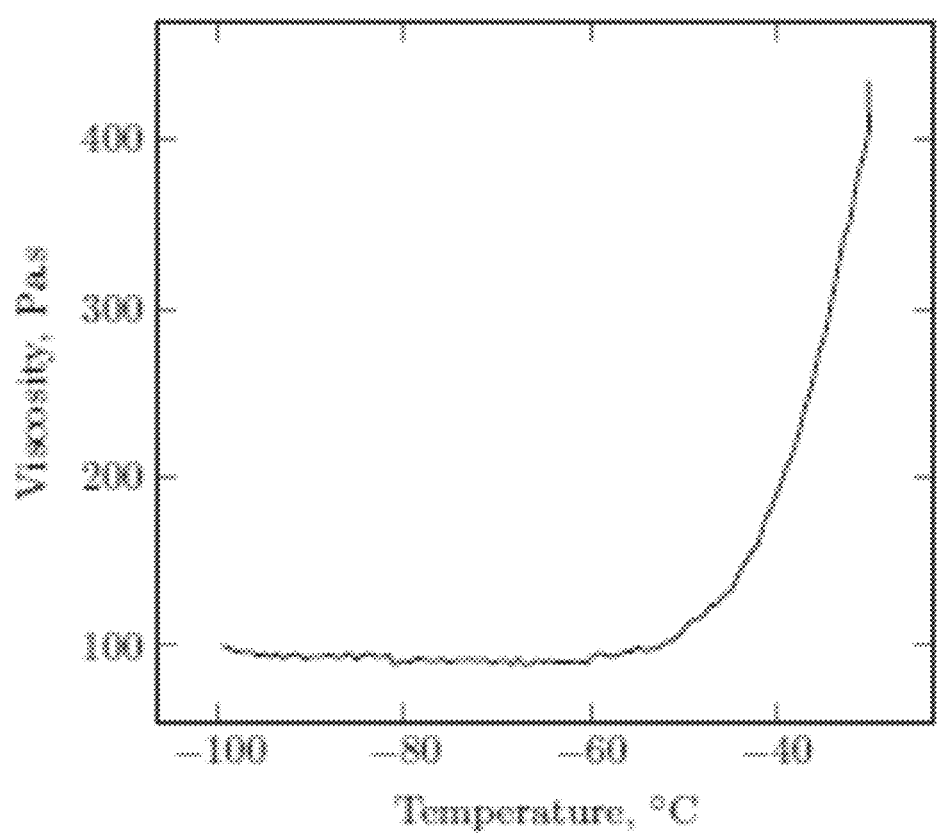
FIG. 5 is a graph showing the effect of temperature ramp on measurement of viscosity of nanocomposite gel formed with 1 wt % polymer and 15 wt % salt (polymer weight basis).

A temperature scan of NC gel showed that the viscosity of the gel remains constant until −50° C. (FIG. 5). Given that the THF freezing point is at −108° C., the gel would not be expected to have the structural stability shown in the plot though the material being measured contains nearly 90% of THF. This suggests that the nanocomposite material has absorbed all the THF and essentially trapped it from evaporating. Increasing the temperature above −50° C. causes a very big increase in the viscosity, which takes the value to nearly 400 Pa·s at −30° C. This abnormal increase could have been the result of tetrahydrofuran evaporating from the sample. Though the boiling point of THF is above ambient temperature, it was believed that the measurement is exaggerated because of the type of temperature control being used in the instrument, which is a forced convection oven.

Figure 6:
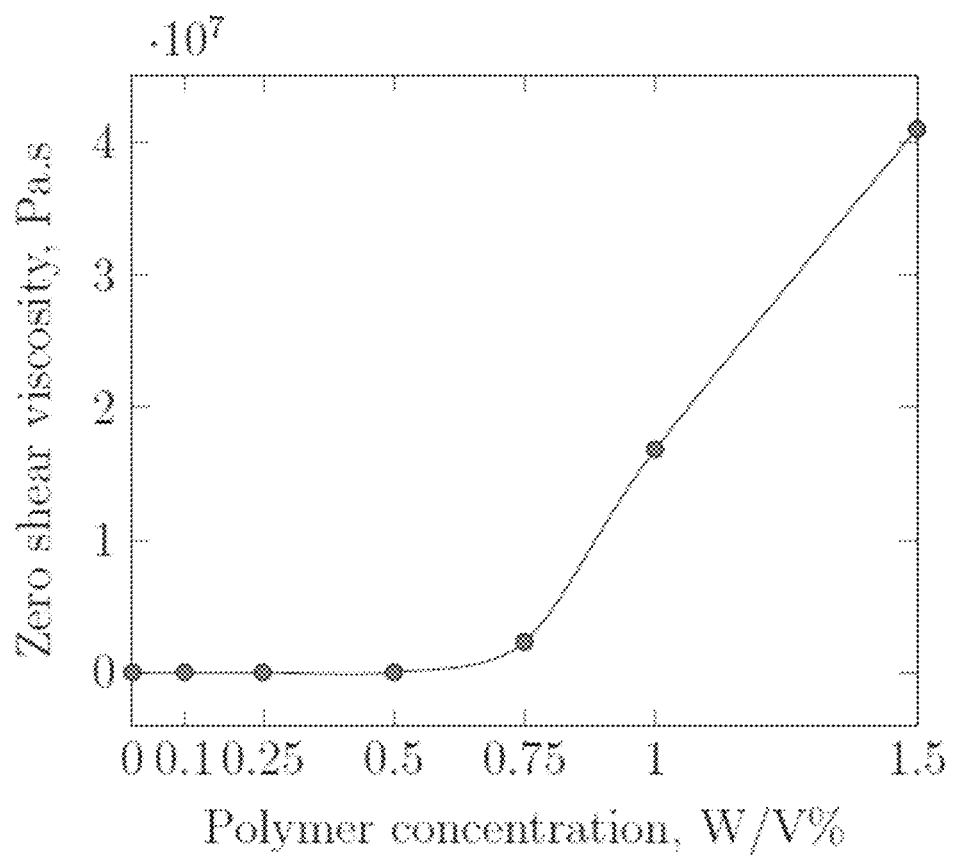
FIG. 6 is a graph showing zero shear viscosity of nanocomposite gels formed with varying amount of nanocomposite loading (w/v %) and 15 wt % salt (polymer weight basis) in THF, where the nanocomposite block copolymer molecular weight is 150 kDa with 62% first block (ENbn) weight fraction.
Figure 9:
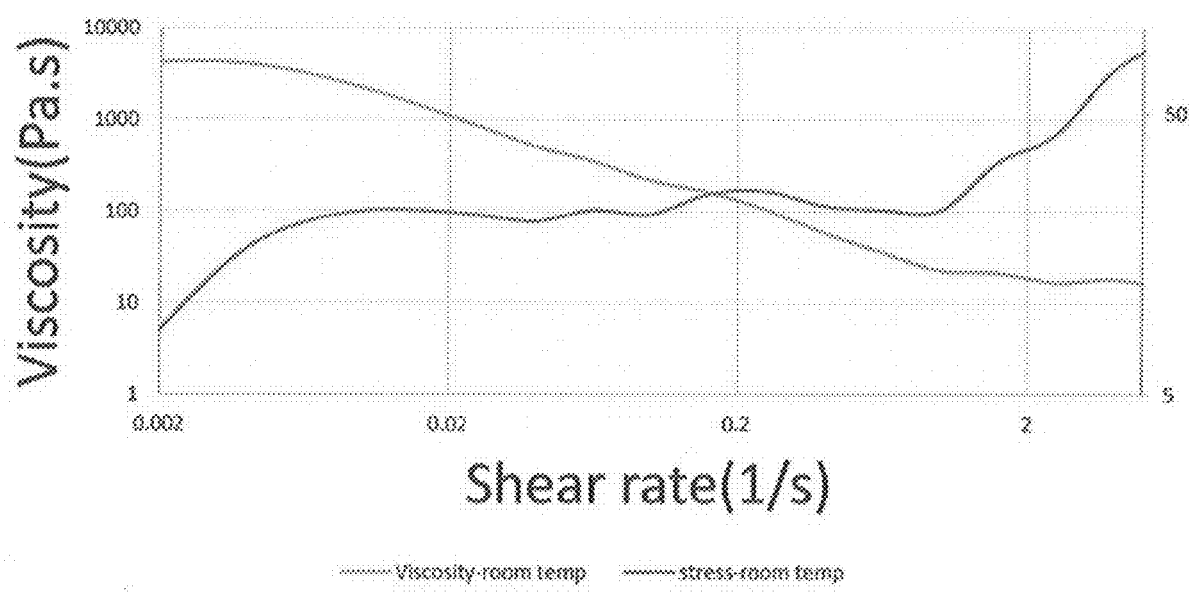
FIG. 9 is a graph showing shear viscosity and stress measured against shear rate on TA ARES G2 instrument for 1 w/v % of nanocomposite and 15 wt % of salt (polymer weight basis) in THF at room temperature.

The next set of graphs show the effects of changing the polymer and salt loading (Table 1) on the viscosity of NC gels. The zero shear viscosity in the following figures referred to the viscosity data at shear rate equals 0 1/s. The viscosity graph for a variety of shear rates is shown in FIG. 9. FIG. 6 shows that the influence of nanocomposite concentration on viscosity of different NC gels. As shown in FIG. 6, the viscosity increases as the nanocomposite concentration is increased above 0.5 w/v %. The increase in solution viscosity is modest below this solid loading. However, the viscosity increase grows exponentially above this threshold. Therefore, the increasing nanocomposite concentration, in turn resulting in increased polymer concentration will result in there being more polymer chains in NC gel network. The higher quantity of polymer chains makes it easier for the polymer chains to interact with others resulting in the effect seen here.

Figure 7:
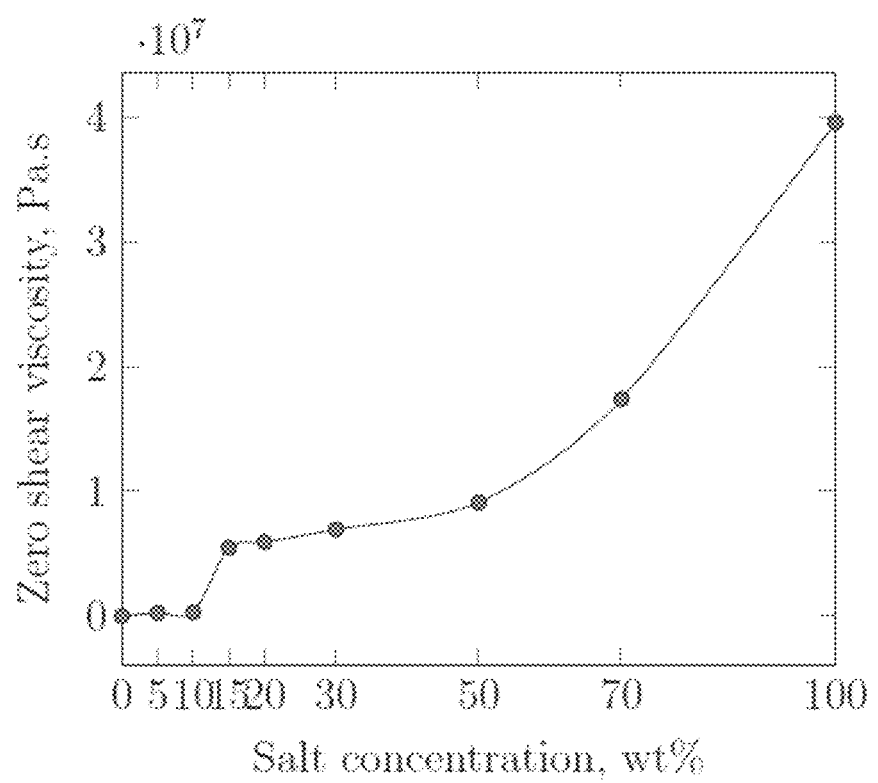
FIG. 7 is a graph showing zero shear viscosity of nanocomposite gels formed with 1 w/v % of nanocomposite and varying amounts of salt (polymer weight basis) in THF, where the nanocomposite block copolymer molecular weight is 150 kDa with 62% first block (ENbn) weight fraction.

FIG. 7 shows the viscosity profile of 1 w/v % NC gels with a variety of salt concentrations. Increasing the salt concentration does not show any significant effect on the gel viscosity up until 10 wt % and further increase results in higher viscosity. As salt concentration in the solution is increased, more polymer chains can participate in the dynamic exchange process and greatly increase the viscosity because of that.

Figure 8:
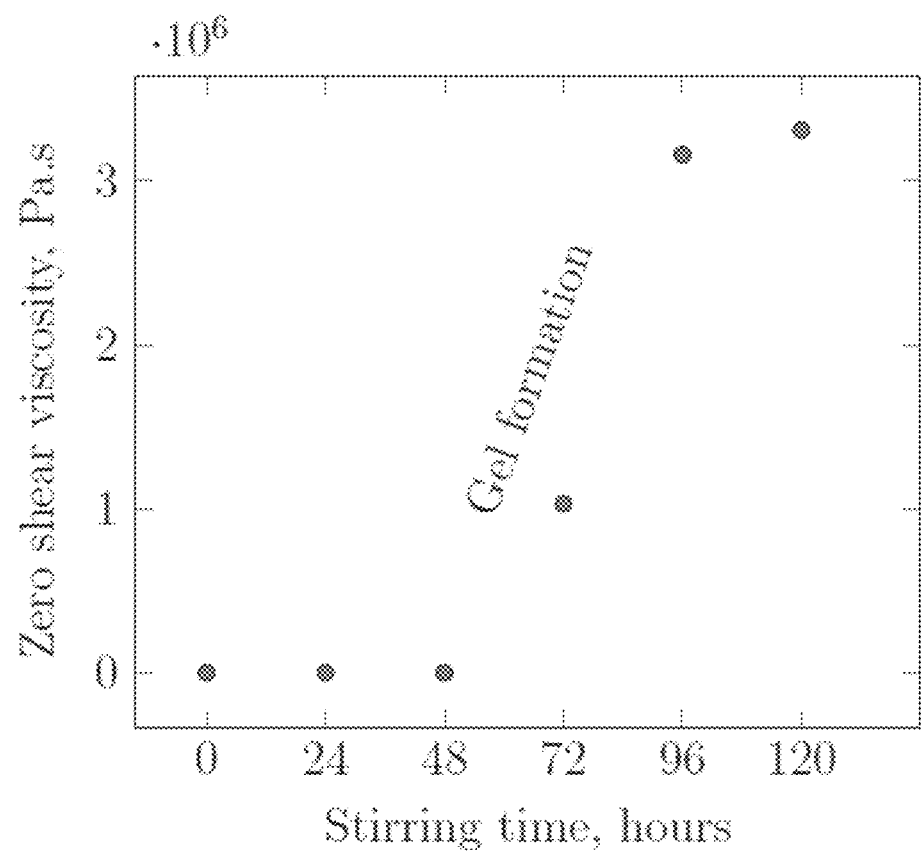
FIG. 8 is a graph showing zero shear viscosity profile of nanocomposite gel formed with 1 w/v % of nanocomposite and 15 wt % salt (polymer weight basis) in THF, where the nanocomposite block copolymer molecular weight is 150 kDa with 62% first block (ENbn) weight fraction.
Figure 12:
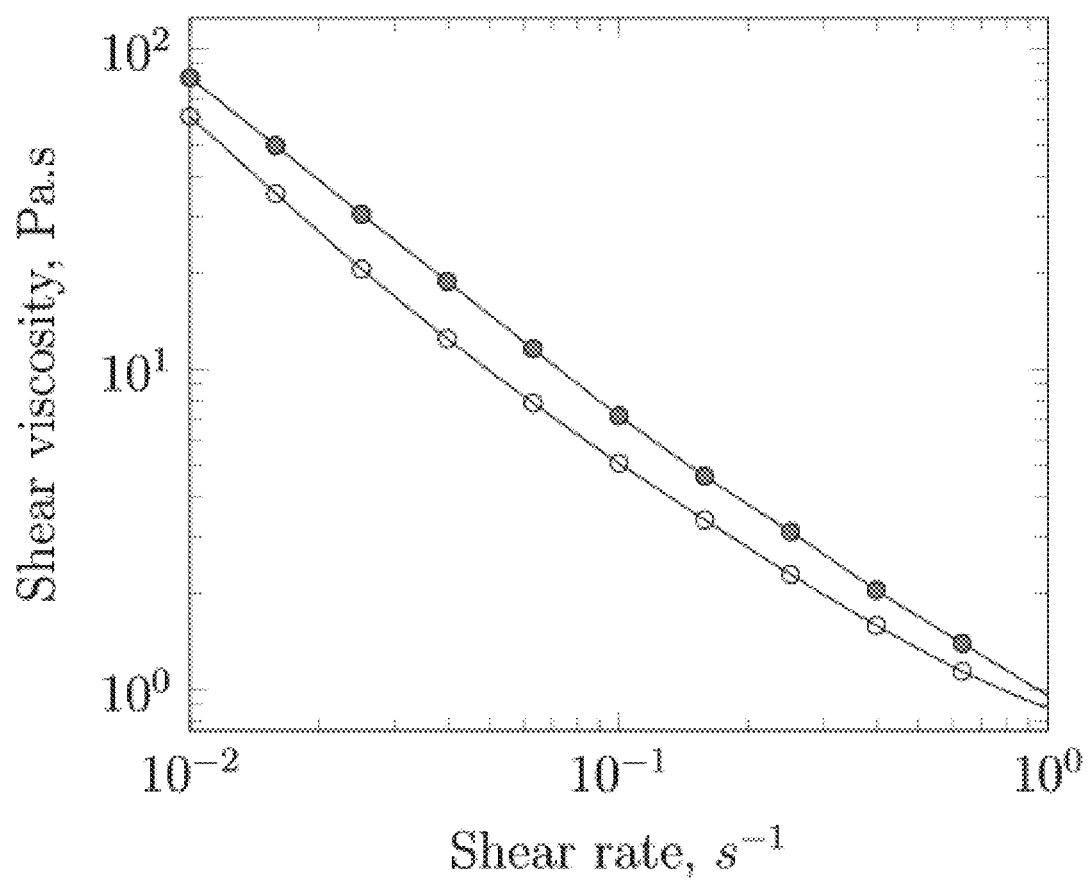
FIG. 12 is a graph showing decrease in shear viscosity of 1 w/v % nanocomposite and 15 wt % salt (polymer weight basis) gel when extra solvent was added and stirred for extra time.

FIG. 8 shows the relationship between viscosity profile and the time of stirring of 1 w/v % with 15 wt % salt concentration. After a certain amount of stirring time, around 48 hours, the viscosity starts increasing, which indicates that the gel network structure has started forming. During the gel formation period, the viscosity increases dramatically, then the rate of viscosity increase slows down. The gel formation process occurs in a very slow manner over lengthy time scales. At the beginning, the viscosity does not change much. However, after the polymer chains start to interact with the clay, the sodium ionic atoms, and other polymer chains, there will be a large increase in viscosity. The viscosity keeps increasing exponentially until the gel network structure is completely formed. After this period, the rate of viscosity increase becomes slow, because most of the polymer chains had already interacted with other polymer chains to form a network structure and an equilibrium has been reached. In this stage, most of the chains are being broken or reformed with very few new interactions. When the gel network structure is saturated or no more polymer chains can be involved in gel network structure, there will be no increase of viscosity. FIG. 12 shows the effect of addition of extra solvent at this stage and stirring for extra time. The resultant gel has a lowered viscosity profile, indicating that the gel structure has reshaped. A covalently crosslinked system would have showed an increase in volume with no change in viscosity of the gel.

Figure 10:
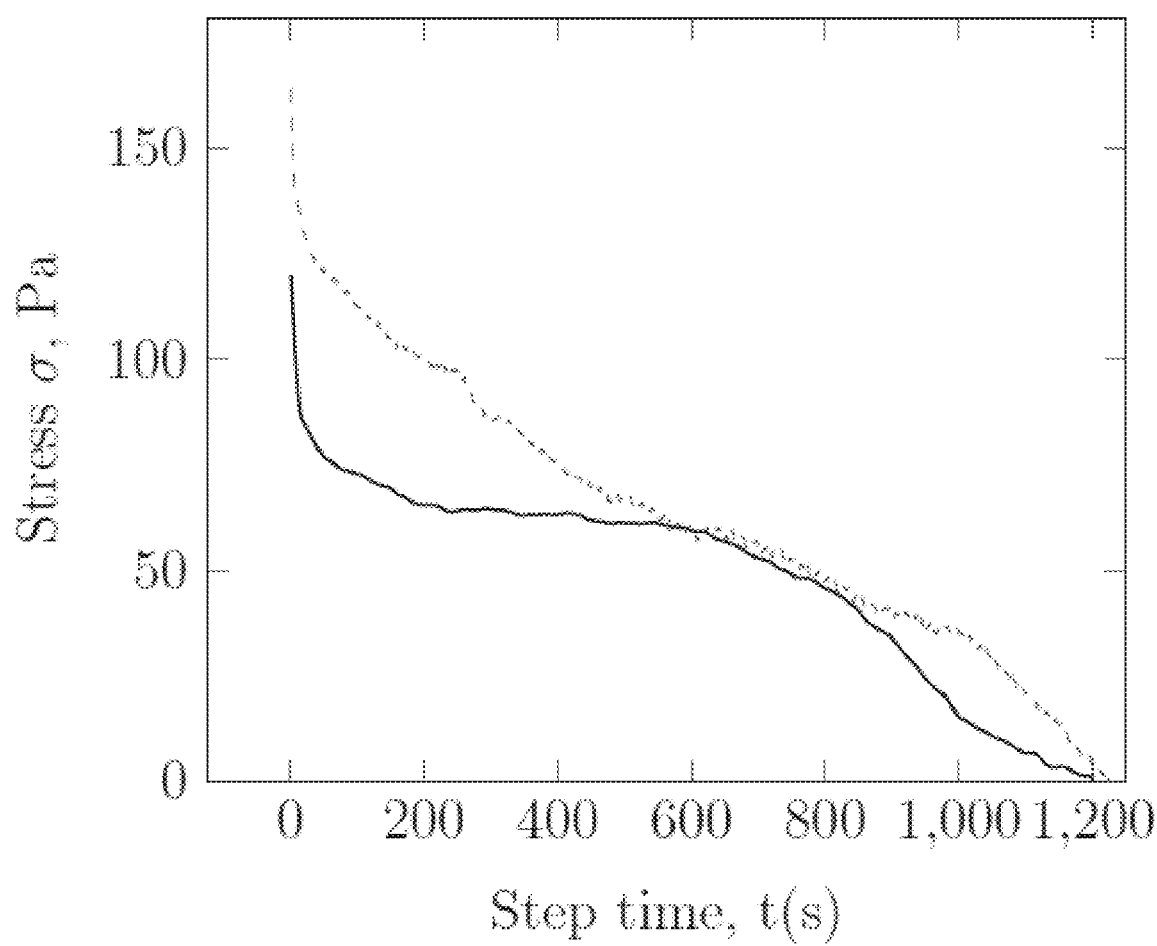
FIG. 10 is a graph showing stress-relaxation behavior of nanocomposite gels with 1 w/v % of nanocomposite with two different salt concentrations (15 wt % and 50 wt % (dashed) (polymer weight basis)) dissolved in THF.

FIG. 10 shows stress relaxation behavior of NC gels with two different salt concentrations. Gel samples with 1 w/v % NC and 15 wt % and 50 wt % salt show similar relaxation response time, close to 1200 s. The time scale of relaxation is independent of concentration of salt in the NC gel system. However, the two samples have different relaxation profiles where the 15 wt % sample shows immediate relaxation behavior with a steep drop in initial stress but then shows a plateau until around 600 s after which the stress is totally dissipated to zero. This sample behaves both as plastic and pseudo elastic solid over time. During the plastic deformation regime, the sample relaxation happens because the ionic crosslinks are constantly being broken and reformed. And, during the elastic deformation regime, the relaxation happens when solvent oozes out of the gel system and polymer entanglements (Zhao et al., "Stress-Relaxation Behavior in Gels With Ionic and Covalent Crosslinks," *J. Appl. Phys.* 107: 063509 (2010), which is hereby incorporated by reference in its entirety). On the contrary, the gel sample with 50 wt % showed total plastic deformation until all stress has decayed. Ionically crosslinked systems are known for forming non-permanent networks which may behave differently when the number of crosslinks increase, which is the case for 50 wt % salt sample (Berger et al., "Structure and Interactions in Covalently and Ionically Crosslinked Chitosan Hydrogels for Biomedical Applications," *Eur. J. Pharm. Biopharm.* 57:19-34 (2004), which is hereby incorporated by reference in its entirety).

Example 9—Conclusion

Block copolymer nanocomposites of poly(ethylidene norbornene-b-cyclopentene) synthesized via surface initiated ROMP when dissolved in tetrahydrofuran solvent along with an ionic salt (for example NaCl) resulted in formation of viscoplastic gels. NC gels formed with polymer loading as low as 0.5 wt % and salt loading as low as 15 wt % (polymer weight basis) showed measured viscosities in the range of 100 Pa·s at room temperature. There is a 15 wt % of minimum salt requirement for the NC gel to form and the absence of ionic salt or MMT clay resulted in no gel formation. TEM micrographs show that the nanocomposite forms an interpenetrating network in the gel. It is believed that that when an ionic salt is added to the nanocomposite dissolved in a suitable solvent the ions will disassociate the polymer chains from the clay surface and result in dynamic reversible linking which forms high viscosity gels.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. A nanocomposite organo gel having a continuous polymeric network structure, wherein the continuous polymeric network structure comprises polymer chains held together by dynamic inter/intraparticle chain entanglements and ionic interaction between the polymer chain ends which terminate in a surface modifier, an ionic salt, and a layered silicate.

2. The nanocomposite organo gel of claim 1, wherein the continuous polymeric network structure is an inter-penetrating polymeric network.

3. The nanocomposite organo gel of claim 1, wherein the polymeric network structure is a block copolymer.

4. The nanocomposite organo gel of claim 1, wherein the polymeric network structure comprises at least one PA block and at least one PB block, wherein PA represents a polymer block comprising one or more units of monomer A and PB represents a polymer block comprising one or more units of monomer B.

5. The nanocomposite organo gel of claim 4, wherein the monomer A is selected from the group consisting of ethylidene norbornene and cyclopentene.

6. The nanocomposite organo gel of claim 4, wherein the monomer B is selected from the group consisting of ethylidene norbornene and cyclopentene.

7. The nanocomposite organo gel of claim 1, wherein the nanocomposite organo gel is thermoplastic.

8. A viscosity modifier comprising the nanocomposite organo gel according to claim 1.

9. A fracking fluid composition comprising:
water;
sand; and
the nanocomposite organo gel of claim 1.

10. A method for preparing a fracking liquid comprising:
mixing the nanocomposite organo gel of claim 1 with water and sand.

* * * * *